(12) United States Patent
Axblom

(10) Patent No.: US 8,955,784 B2
(45) Date of Patent: Feb. 17, 2015

(54) SELF-LOCKING SEAT BELT RETRACTOR

(75) Inventor: Per Axblom, Alingsås (SE)

(73) Assignee: Autoliv Development AB, Vårgårda (SE)

( * ) Notice: Subject to any disclaimer, the term of this patent is extended or adjusted under 35 U.S.C. 154(b) by 473 days.

(21) Appl. No.: 13/382,192

(22) PCT Filed: Jul. 14, 2010

(86) PCT No.: PCT/EP2010/004260
§ 371 (c)(1),
(2), (4) Date: Jan. 4, 2012

(87) PCT Pub. No.: WO2011/012222
PCT Pub. Date: Feb. 3, 2011

(65) Prior Publication Data
US 2012/0104137 A1    May 3, 2012

(30) Foreign Application Priority Data
Jul. 28, 2009    (DE) .......................... 10 2009 035 047

(51) Int. Cl.
*B60R 22/34*    (2006.01)
*B60R 22/28*    (2006.01)

(52) U.S. Cl.
CPC ....... *B60R 22/3413* (2013.01); *B60R 2022/287* (2013.01)
USPC ........................................ 242/379.1; 297/472

(58) Field of Classification Search
CPC .................. B60R 22/3413; B60R 22/4676
USPC ......... 242/379.1; 280/805, 807; 297/471, 472
See application file for complete search history.

(56) References Cited

U.S. PATENT DOCUMENTS

| | | | |
|---|---|---|---|
| 5,772,144 A * | 6/1998 | Tanabe et al. | 242/379.1 |
| 2001/0006204 A1 | 7/2001 | Kajiyama | |
| 2002/0023981 A1 * | 2/2002 | Nagata et al. | 242/379.1 |

(Continued)

FOREIGN PATENT DOCUMENTS

| | | |
|---|---|---|
| DE | 199 27 427 A1 | 1/2001 |
| DE | 10 2007 057 661 A1 | 6/2009 |

(Continued)

OTHER PUBLICATIONS

German Search Report —Jan. 21, 2011.
PCT International Search Report—Jan. 21, 2011.

*Primary Examiner* — Sang Kim
(74) *Attorney, Agent, or Firm* — Brinks Gilson & Lione

(57) ABSTRACT

A self-locking seat belt retractor has the following components: a locking device (9) which can be actuated in a vehicle-sensitive and/or in a belt webbing-sensitive manner, a belt shaft (1), and a two-stage load limiting device (13) located within the force flow between the locking device (9) and the belt shaft (1). The load limiting device (13) includes a first, high-load limiting element (3) and a second, low-load limiting element (2). The load limitation level can be switched from high to low during load limitation. A third load limiting element (14) parallel to the second load limiting element (2) between the locking device (9) and the belt shaft (1) is formed by at least two structural elements (10, 11, 12, 20a, 20b, 21a-21g, 22a-22g), at least one of which is sheared off during the load limitation.

9 Claims, 2 Drawing Sheets

(56) References Cited

U.S. PATENT DOCUMENTS

2003/0071452 A1* 4/2003 Siegfried et al. ............ 280/801.1
2005/0224622 A1* 10/2005 Zolkower .................... 242/379.1

FOREIGN PATENT DOCUMENTS

| WO | WO 2009045132 A1 * | 4/2009 | ............. B60R 22/34 |
| WO | WO 2011/006647 A1 | 1/2011 | |

* cited by examiner

SELF-LOCKING SEAT BELT RETRACTOR

CROSS REFERENCE TO RELATED APPLICATIONS

This application claims priority to German Patent Application No. 10 2009 035 047.9, filed Jul. 28, 2009, and PCT International Patent Application No. PCT/EP2010/004260, filed Jul. 14, 2010.

FIELD OF THE INVENTION

The invention relates to a self-locking seat belt retractor for a motor vehicle seat belt system.

BACKGROUND AND SUMMARY OF THE INVENTION

A generic seat belt retractor is known for example from DE 199 27 427 C2. The seat belt retractor described by that reference has a two-stage load limiting system in which the load limitation level can be switched from a high load limitation level to a low load limitation level. The load limiting device further includes a torque tube between the belt shaft and the load limiting device designed as a torsion bar, which torque tube is releasably locked in relation to the belt shaft. When the torque tube is released, the load limitation level is switched from the high level to the low level. In order that there is a smooth transition between the high level and the low level, an additional deformable element shall be located between the torque tube and the belt shaft. The above-mentioned publication does not give any information about the design of this deformable element.

From DE 10 2007 057 661 A1, a self-locking seat belt retractor having the same configuration is known in which the third load limiting element is formed by a bending wire located parallel to the belt shaft. The contribution of the third load limiting element to the load limitation characteristic is effected by the bending wire being wound around the axis of a torsion bar at the same time being plastically deformed out of the parallel alignment to the belt shaft. Thus, an installation space needs to be provided in the seat belt retractor suitable for mounting the bending wire prior to deformation as well as after deformation. Furthermore, the load limitation level to be realized by the third load limiting element is limited by the plastic deformation energy of the bending wire and can only be increased by enlarging the bending wire itself. As, according to today's requirements of the vehicle manufacturers, seat belt retractors shall be designed to be as small as possible, it might be difficult for installation space reasons to achieve the required load limitation characteristic with this solution.

Therefore, it is the object of the invention to provide a self-locking seat belt retractor comprising a two-stage load limiting device with two load limiting elements having different load limitation levels and a third load limiting element acting parallel to the load limiting element having the low load limitation level, which seat belt retractor shall take up as little installation space as possible.

For the solution of the object, the invention proposes a self-locking seat belt retractor comprising the features of claim 1.

The basic idea of the invention is that the third load limiting element is formed by at least two structural elements resting against each other within the force flow between the locking device and the belt shaft, at least one of which structural elements is sheared off during the load limitation.

With the proposed solution, the energy dissipation upon the activation of the third load limiting element is effected by shearing off the structural elements. The shearing-off process is a deformation effected by shear forces allowing a maximum energy dissipation in a minimum space provided the structural elements have an appropriate shape and the material of the structural elements is chosen accordingly. As the deformation of the structural elements subject to the shear forces, besides the plastic deformation, generally implies the destruction of the structural elements, more energy can be consumed thereby than it would be possible with a deformation subject to bending forces. Furthermore, the structural elements are not moved from one installation space to another installation space during the load limitation so that the proposed load limiting element in itself can be regarded as being stationary requiring less installation space. Furthermore, the load limitation effected by the third load limiting element, due to the structural elements resting against each other, starts immediately when the relative rotational movement is initiated so that no installation space is wasted either thereby.

BRIEF DESCRIPTION OF THE DRAWINGS

In the following, the invention is described in more detail on the basis of a preferred embodiment. The figures show.

DETAILED DESCRIPTION OF THE INVENTION

Figure 1:
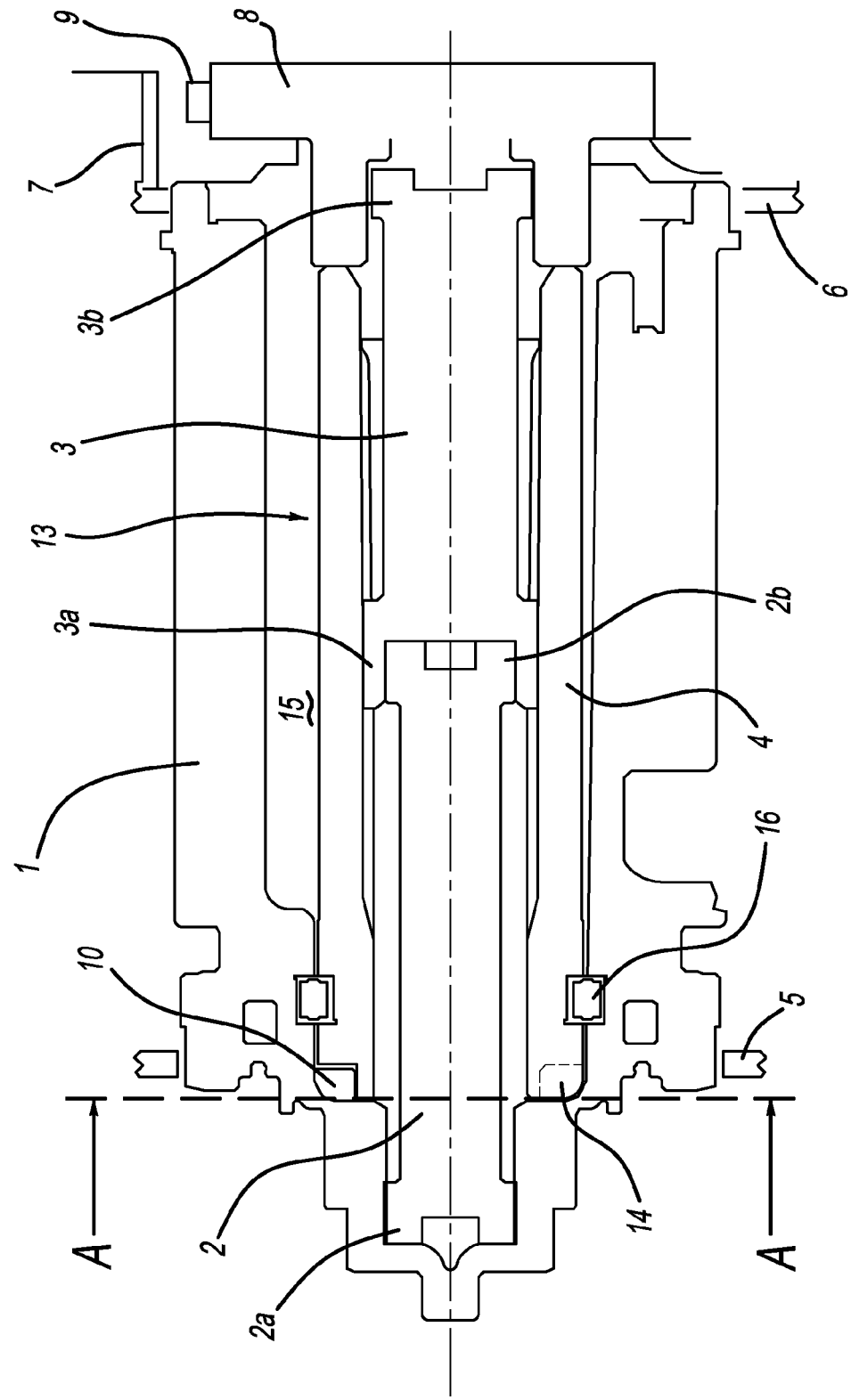
FIG. 1 shows a self-locking seat belt retractor with a two-stage load limiting device and a third load limiting element according to the invention.

FIG. 1 shows a self-locking seat belt retractor comprising a belt shaft 1 rotatably mounted in two frame pieces 5 and 6 of a seat belt retractor frame. A profile head 8 is located on one side of the belt shaft 1 carrying a locking device 9 in the form of a locking pawl, which locking device can be actuated in a vehicle-sensitive and/or in a belt webbing-sensitive manner. When the locking device 9 is actuated it engages into a housing-fixed toothing 7 allocated to the frame piece 6 and thereby locks the belt shaft 1 in the belt webbing extraction direction. A two-stage load limiting device 13 is located in a hollow space 15 of the belt shaft 1 within the force flow between the locking device 9 and the belt shaft 1. The load limiting device 13 allows a load-limited belt webbing extraction when a defined load limitation level is exceeded.

The two-stage load limiting device 13 includes a first and a second load limiting element 3 and 2, each being designed as a torsion bar. The first load limiting element 3 with one end 3b is connected to the profile head 8 in a rotationally fixed manner, and with one end 3a is connected to one end 2b of the second load limiting element 2 in a rotationally fixed manner. The second load limiting element 2 with the other end 2a is connected to the belt shaft 1 in a rotationally fixed manner so that the two-stage load limiting device 13 forms the force-closed connection between the belt shaft 1 and the locking device 9.

Furthermore, a connecting element 4 is provided, which is connected to the end 3a of the first load limiting element 3 in a rotationally fixed manner and via this is indirectly connected to the end 2b of the second load limiting element 2 in a rotationally fixed manner as well. At the beginning of the load-limited belt webbing extraction the connecting element 4 is connected to the belt shaft 1 via a detachable connection 16 so that the force flow is conducted from the belt shaft 1 via the connecting element 4 into the end 3a of the first load limiting element 3. Thus, at the beginning of the load limitation the high load limitation level defined by the first load limiting element 3 is acting. In order to switch from the high load limitation level to the low load limitation level, the connection 16 is disconnected so that the connecting element 4 is able to rotate freely in relation to the belt shaft 1 and as a result the load limitation level defined by the second load limiting element 2 is acting, as now the end 2a is twisted in relation to the end 2b. In this case, the end 2b, due to the connection to the first load limiting element 3 with the high load limitation level, can be regarded as a fixed end.

In order to compensate the temporary drop in force when the load limitation level is switched, a third load limiting element 14 acting parallel to the second load limiting element 2 is provided. The third load limiting element 14 is formed by a structure on the front end of the tubular connecting element 4 and in a corner of the hollow space 15 of the belt shaft 1. The structure comprises structural elements 10, 11, 12, 20a, 20b, 21a-21g and 22a-22g resting against each other which are located on the connecting element 4 and on the belt shaft 1, wherein the structural elements 10, 11, and 12 are allocated to the belt shaft 1 and the structural elements 20a, 20b, 21a-21g and 22a-22g are allocated to the connecting element 4. The load limiting element 14 thus is not formed by a single element but by all structural elements 10, 11, 12, 20a, 20b, 21a-21g and 22a-22g which come into effect simultaneously or in chronological order, as it will still be described below.

The structural elements 10, 11, 12, 20a, 20b, 21a-21g and 22a-22g are located on a radial outer edge of the tubular connecting element 4 and in an opposite corner of the hollow space 15 of the belt shaft 1 so that each has two free sides and they engage with each other in a fingerlike manner. Owing to the two free sides the surface with which the structural elements 10, 11, 12, 20a, 20b, 21a-21g and 22a-22g rest against each other can be chosen extra large. Moreover, each structural element 10, 11, 12, 20a, 20b, 21a-21g and 22a-22g is connected to the connecting element 4 or to the belt shaft 1 on two sides only providing advantages with respect to the possibility of forming the structural elements integrally with the belt shaft 1 and/or with the connecting element 4, for example by way of a die casting process.

Figure 2:
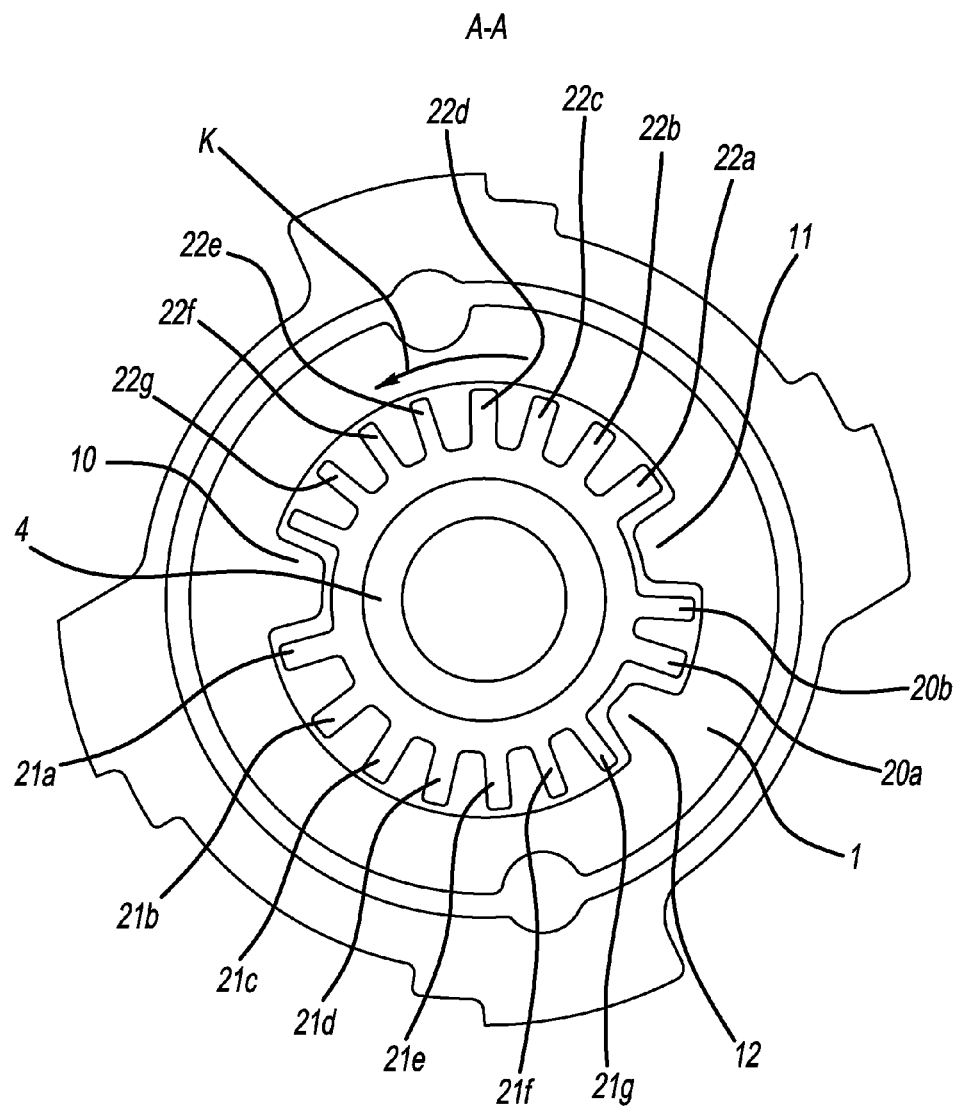
FIG. 2 shows a cross-section of the self-locking seat belt retractor from FIG. 1 in the cutting direction A-A.

FIG. 2 in detail shows the allocation of the structural elements 10, 11, 12, 20a, 20b, 21a-21g and 22a-22g. The structural elements 10, 11 and 12 are allocated to the belt shaft 1 and, at the beginning of the load-limited belt webbing extraction movement, in the arrow direction "K" rest against the structural elements 20a, 21a and 22a allocated to the connecting element 4. When the belt shaft 1 now starts to rotate in relation to the connecting element 4 in the arrow direction "K", at first the structural elements 20a, 21a, and 22a are sheared off by the structural elements 10, 11, and 12. For this purpose, the structural elements 10, 11 and 12 of the belt shaft 1 have a considerably higher strength than the structural elements 20a, 21a, and 22a, that is realized here by the structural elements 10, 11 and 12 having a considerably greater width in the circumferential direction. Alternatively, the structural elements 20a, 20b, 21a-21g and 22a-22g could be designed to be stronger; it only is important that there is a clear difference in the strength of the structural elements 10, 11, 12, 20a, 20b, 21a-21g and 22a-22g, in order that not both structural elements 10, 11, 12, 20a, 20b, 21a-21g and 22a-22g resting against each other are deformed or destroyed during the shearing-off process.

Thus, the structural elements can be differentiated into structural elements 10, 11, and 12 shearing off and sheared off structural elements 20a, 20b, 21a-21g, 22a-22g, wherein the sheared off structural elements 20a, 20b, 21a-21g, 22a-22g form a rib-like structure through which the structural elements 10, 11 and 12 shearing off are moved in an energy dissipating manner.

During the further rotation of the belt shaft 1 the structural elements 20b, 21b-21g and 22b-22g are sheared off by the acting shear forces. Besides, the thickness of the structural elements 20a, 20b, 21a-21g, 22a-22g decreases in the rotating direction of the belt shaft 1 so that the energy dissipated while the structural elements 20a, 20b, 21a-21g, 22a-22g are being sheared off and the load limitation level effected thereby diminish as well. Furthermore, after the structural element 12 has sheared off the structural element 20b, only the structural elements 10 and 11 are still acting.

With this kind of load limiting element the load limitation level can be determined in a constructively simple way by the number of structural elements 20a, 20b, 21a-21g, 22a-22g sheared off per time unit and by the energy dissipated when a structural element 20a, 20b, 21a-21g, 22a-22g is being sheared off. In this case, the load limitation characteristic was configured to be degressive by the number of structural elements 20a, 20b, 21a-21g, 22a-22g which are sheared off simultaneously and by the thickness of the structural elements 20a, 20b, 21a-21g, 22a-22g decreasing during the load limitation.

The load limitation characteristic can be made even more constant by the acts of shearing off the structural elements 20a, 20b, 21a-21g, 22a-22g being carried out in an overlapping manner, i.e. one structural element 20a, 20b, 21a-21g, 22a-22g is started to be sheared off at a time when another structural element 20a, 20b, 21a-21g, 22a-22g is being sheared off already or when it is still being sheared off. With the structural elements 20a, 20b, 21a-21g, 22a-22g being arranged and designed accordingly the load limitation can be configured in such a way that at any time at least one structural element 20a, 20b, 21a-21g, 22a-22g is being sheared off.

While the above description constitutes the preferred embodiment of the present invention, it will be appreciated that the invention is susceptible to modification, variation, and change without departing from the proper scope and fair meaning of the accompanying claims.

The invention claimed is:

1. A self-locking seat belt retractor; comprising:
    a locking device which can be actuated in a vehicle-sensitive or in a belt webbing-sensitive manner,
    a belt shaft, upon which the belt webbing can be wound,
    a two-stage load limiting device operatively arranged between the locking device and the belt shaft, thereby creating a force flux between the locking device and the belt shaft for allowing a load-limited belt webbing extraction during a load limitation action, the load limiting device including
        a first load limiting element having a high load limitation level, and
        a second load limiting element having a low load limitation level, the load limiting device being configured to be switched from the high load limitation level to the low load limitation level during the load limitation action,
    a third load limiting element acting parallel to the second load limiting element with the low load limitation level provided between the locking device and the belt shaft,
    wherein the third load limiting element is formed by at least two first structural elements and at least a first set and a second set of second structural elements, one of the second structural elements of each of the first set and the second set resting against one of the at least two first structural elements within the force flow between the locking device and the belt shaft, wherein the second structural elements are sheared off during the load limitation action when the load acting on the webbing exceeds the low load limitation level, and wherein the first set of second structural elements consists of a different number of second structural elements than the second set of second structural elements.

2. The self-locking seat belt retractor according to claim 1, further comprising that at least one of the second structural elements of the first set and at least one of the second structural elements of the second set are sheared off simultaneously.

3. The self-locking seat belt retractor according to claim 2 further comprising
that a number of the second structural elements being sheared off simultaneously decreases during the load-limited belt webbing extraction.

4. The self-locking seat belt retractor according to claim 1, further comprising
the second-structural elements of at least one of the first and second sets are sheared off successively.

5. The self-locking seat belt retractor according to claim 4 further comprising
that a diminishing energy is dissipated while the second structural elements are being sheared.

6. The self-locking seat belt retractor according to claim 1 further comprising
that at least one of the second structural elements of the first set and at least one of the second structural elements of the second set are sheared off at different times, and
that the different times overlap.

7. The self-locking seat belt retractor according to claim 1 further comprising
that the first and the second load limiting element each are connected to each other at one of both of their ends,
that a connecting element is provided via which the ends connected to each other are coupled to the belt shaft, and
that the first and second structural elements of the third load limiting element resting against each other are formed by the connecting element and by the belt shaft.

8. The self-locking seat belt retractor according to claim 7 further comprising that the connecting element is formed from a tube located in a hollow space of the belt shaft, and that the first and second structural elements resting against each other are located on a radial outer edge of the tube and in an opposite corner in the hollow space of the belt shaft.

9. The self-locking seat belt retractor according to claim 1 further comprising that the first and second structural elements are located in a corner or on an edge.

\* \* \* \* \*